United States Patent

[11] 3,565,371

| [72] | Inventors | Herbert Q. Bair<br>Tallmadge;<br>Fred R. Nebiker, Akron, Ohio |
|---|---|---|
| [21] | Appl. No. | 708,926 |
| [22] | Filed | Feb. 28, 1968 |
| [45] | Patented | Feb. 23, 1971 |
| [73] | Assignee | Goodyear Aerospace Corporation<br>Akron, Ohio |

[54] CATENARY KEEL FLEXIBLE WING GLIDER
3 Claims, 5 Drawing Figs.

| [52] | U.S. Cl. | 244/138 |
|---|---|---|
| [51] | Int. Cl. | B64d 17/22 |
| [50] | Field of Search | 244/154,<br>138, 142, (EW Digest), 152 |

[56] References Cited
UNITED STATES PATENTS

| 2,745,615 | 5/1956 | Fogel | 244/145 |
|---|---|---|---|
| 3,393,885 | 7/1968 | Neumark | 244/145 |
| 3,412,963 | 11/1968 | Struble, Jr. | 244/152 |
| 3,498,565 | 3/1970 | Nash-Boulden | 244/152 |
| 3,212,730 | 10/1965 | Tschudy et al. | 244/1 |
| 3,285,546 | 11/1966 | Jalbert | 244/145 |
| 3,428,277 | 2/1969 | Everett | 244/146X |

FOREIGN PATENTS

| 427,517 | 12/1966 | Switzerland | 244/FW Digest |
|---|---|---|---|

*Primary Examiner*—Milton Buchler
*Assistant Examiner*—James E. Pittenger
*Attorney*—J.G. Pere

ABSTRACT: The invention provides for the addition of catenary keels to a flexible wing glider. The catenary in the keel is designed to uniformly transfer payload weight to the wing to supply stiffness to the canopy itself and to effectively eliminate the stress concentrations of individual rigging line attachments. The catenary keel also serves as a stabilizer for air passage thus providing lateral stability in the yaw direction, plus increases lifting characteristics by smoothing the aerodynamic configuration of the flexible wing in flight without sacrificing its simplicity, minimum weight, and maximum reliability.

INVENTORS
HERBERT Q. BAIR
FRED R. NEBIKER
BY:
*Oldham & Oldham*
ATTORNEYS

CATENARY KEEL FLEXIBLE WING GLIDER

Heretofore it has been well known that flexible wind gliders are utilized to provide controlled parachute dropping for supplied, or for use with space type vehicles. Such gliders normally are of the packaged flexible wing type, and utilize radio control or the like to vary the glider configuration to achieve guidance. However, part of the problem with such gliders is in their inherent high sensitivity to directional control and concentrated canopy loads at the suspension line attachment. These prior art systems have not had good stability, nor high lift-drag ratios.

Theretofore, it is the general object of the present invention to overcome the foregoing and other objections to the prior art practices by the provisions of a flexible wing glider characterized by the addition of a catenary keel to supply stiffness to the glider canopy itself, and to effectively eliminate stress concentrations of individual rigging line attachments.

Another object of the invention is to provide a catenary keel glider where the keel also provides a channel for air passage thus providing lateral stability in the yaw direction.

A further object of the invention is to provide a catenary keel glider which is inexpensive to construct, has extremely high maneuverability, and a better lift over drag ratio than conventional gliders because of its more streamlined and contoured design.

The aforesaid objects of the invention and other objects which will become more apparent as the description proceeds are achieved by providing in a flexible wing glider the combination of a foldable wing of flexible material, a plurality of suspension lines attached to the wing for connection to a payload, certain other suspension lines having shortened portions to hold the wing when extended in a parachutelike form which is characterized by at least one catenary keel extending substantially fore and aft on the lower surface of the wing, the keel being made from a flexible material and having suspension lines attached thereto to keep the keel substantially perpendicular to the wing during flight thereof, and uniformly transfer weight from the payload through the keel to the wing.

For better understanding of the invention reference should be had to the accompanying drawings wherein.

Figure 1:
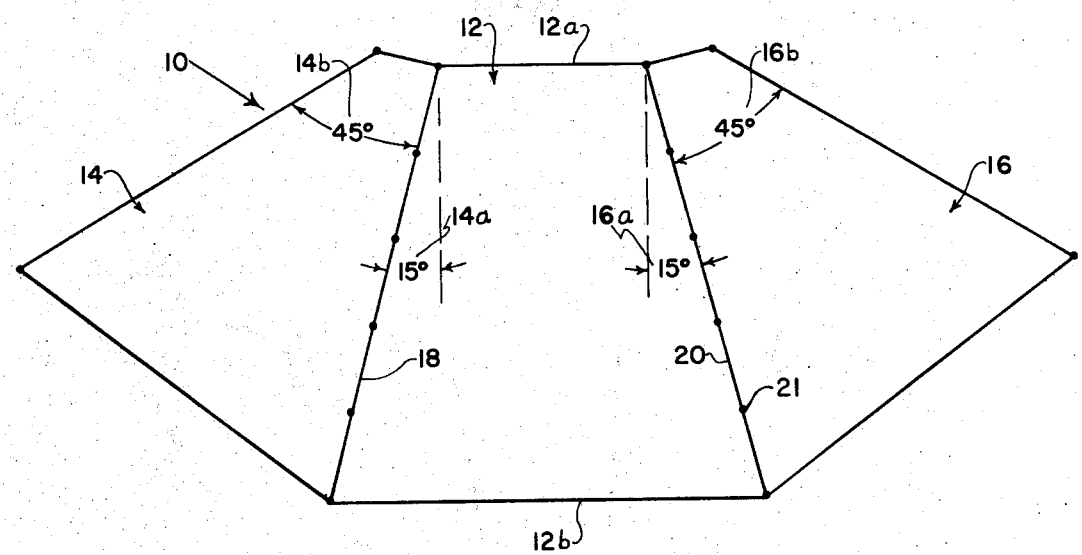
FIG. 1 is a plan view of the glider in flat condition before flight.

With reference to the embodiment of the invention illustrated in FIG. 1 of the drawings, the numeral 10 indicates a twin keel flexible wing glider comprising a center section 12 of a trapezoidal shape having parallel edges 12a and 12b. The angle of the sides is divergent outwardly at about 15° on each edge as indicated by angle 14a and 16a. Side sections 14 and 16 of substantial diamond shape complete the wing. The invention contemplates that the diamond shaped side sections 14 and 16 will enclose 45° angles 14b and 16b. The center panel 12 and side panels 14 and 16 are separated by respective catenary keels 18 and 20. The purpose of the keels 18 and 20 is to provide a vertical support for the rigging lines and to supply stiffness to the canopy itself thus controlling the contour and flow of air with respect to the wing 10, and to effectively eliminate stress concentration of individual rigging line attachments. The rigging line attachments are indicated by larger dots 21. As can also be seen, the catenary keels 18 and 20 provide a channel for air passage thus providing lateral stability in the yaw direction. With a double catenary keel system as shown in FIG. 1, the keel should be divergent from front to back so that airflow will not be restricted and drag will be eliminated. In the illustration the divergence is about 15° on each side as shown by angles 14a and 16a.

Figure 2:
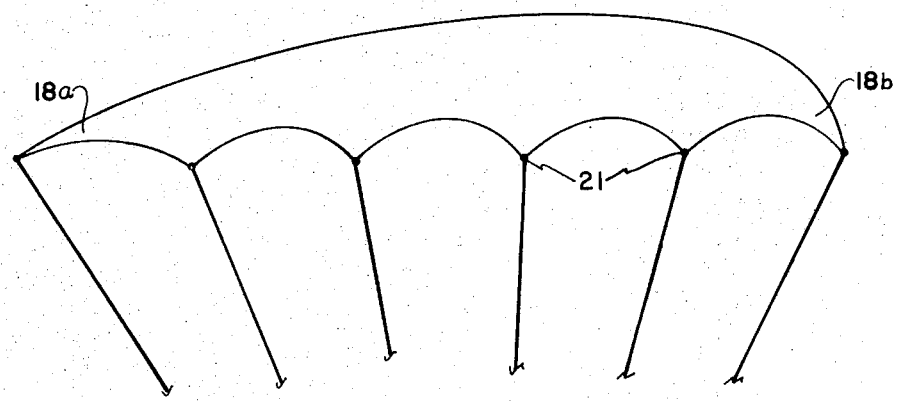
FIG. 2 is a slight elevational view of a keel and its configuration during flight.

FIG. 2 illustrates the side shape of the keel 18 with the front at 18a and the rear portion at 18b. FIG. 2 illustrates five catenary sections to provide attachment points for six lines. It should be noted that the catenary sections are designed so that equal loading will occur along the entire top edge, which is attached normally by stitching to the wing 10 in the position as indicated in FIG. 1.

Figure 3:
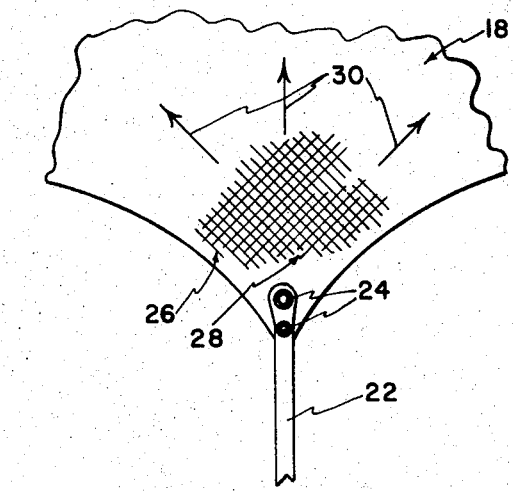
FIG. 3 is an enlarged broken-away elevational view of the rigging attachment to the catenary showing the configuration of the material with respect to the catenaries.

Normally, the invention contemplates particularly the catenary keels 18 and 20 will be made from bias cut flexible canvas so that as loading takes place equal distribution through the material will occur. In other words substantially any nontreated canvas will meet the objects of the invention. This contrasts to the canvas in the canopy, which is usually treated to be nonporous. This is more particularly shown in FIG. 3 which illustrates a section of keel 18 with a rigging line 22 attached by grommets 24 at the peak point between two catenary sections. The canvas material is woven and cut so the weft and warp yarns, illustrated generally by numerals 26 and 28, respectively, are at substantially 45° relationship with respect to the rigging line 22 so as to provide equal stress loading indicated by arrows 30 throughout the material in order to give the smooth contour along the top edge surface of each catenary keel. If the warp and weft lines 26 and 28 were substantially parallel or perpendicular, respectively, to the rigging line 22, unequal loading would occur up through the canvas causing some distortions and unequal stress concentrations in the wing or canopy itself.

Figure 4:
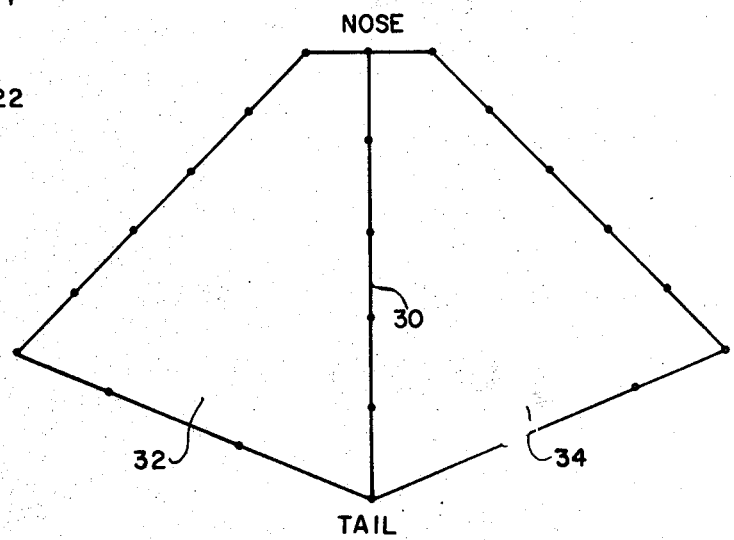
FIG. 4 is a modified embodiment of the invention utilizing a single catenary keel.

FIG. 4 illustrates a modified embodiment of the invention with the center section 12 of FIG. 1 removed and only a single keel 30. Side lobes 32 and 34 are of substantially the same configuration as lobes 14 and 16 in the embodiment of FIG. 1. However, the single catenary keel design utilized on keel 30, is similar to that on twin keels 18 and 20. The nose cut off in the single keel design is approximately ⅛ of the length of the wing. Again the rigging line attachment points are shown by dots on the perimeter and keel.

Figure 5:
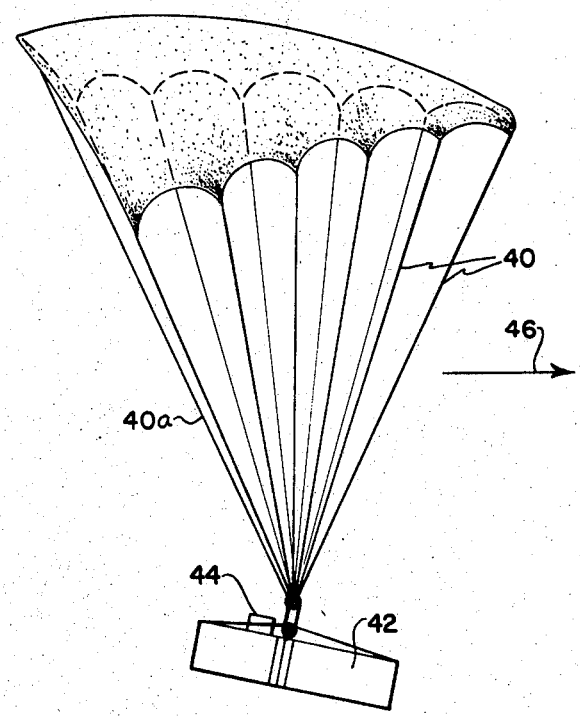
FIG. 5 illustrates the catenary keel glider of the invention in a flight condition with a payload.

FIG. 5 illustrates the flight configuration of either the embodiment of FIG. 1 or FIG. 4 showing how the side flaps extend down and are reefed in by the rigging lines indicated generally by numeral 40 to carry a payload 42. Naturally, as is well understood by those in the art, the rigging lines 40 also attach to the outside edges of the side flaps to draw the wing down into a more parachutelike billowed shape to catch and hold the air in and provide a lift configuration. Normally, in order to provide flight control to the wing, the most rearward rigging line 40a which is attached to the tip of its respective side wing is controlled in length by a small drive motor 44 which might be radio controlled. The controlling of the length of the line 40a, and its respective counter part on the opposite side of the wing can produce right or left turns, or more or less lift in accordance with the desired flight configuration. In the illustration as shown, the direction of flight is indicated by arrow 46, and all this is well understood to those skilled in the art.

Thus, it is seen that the main object of the invention is to increase the lifting characteristics and the stability of the flexible wing in flight without sacrificing its simplicity, minimum weight, and maximum reliability, by providing catenary keels extending substantially vertically down from the canopy itself to equally distribute loading weight on the rigging lines so the contour of the wing or canopy are smooth and aerodynamically more stable.

As a guideline, the depth of the catenary of course depends upon the number of rigging lines desired, but in the embodiment of the invention illustrated, it has been found that the number of rigging lines necessary utilizing the catenary keel design can be substantially reduced from the conventional embodiments of flexible flying wings to thereby eliminate the possiblity of fouling and further facilitate the deployment of the wing to the flight condition. It has been found that the number of rigging lines can be reduced substantially in half from that conventionally needed. Also, it has been found that the depth of the catenary keel should be approximately 10 percent of the rigging line length to supply a stiffness to the canopy itself, although this depth configuration of course will vary on the number of rigging lines utilized and the particular characteristics of the wing. However, it is felt that a keel depth of between one-fifth to one-fifteenth of the length to the rigging lines is necessary to achieve the objects of the invention.

An increased lift over drag is resultant due to the streamlined air flow, and greater stability in the yaw direction is achieved by the use of the catenary keel. Also, lighter weight material or less reinforcements in the connection of the rigging lines to the wing is required due to the elimination of stress concentrations at the keel rigging line attachment points.

In accordance with the Patent Statutes only one best known embodiment of the invention has been illustrated and described in detail, but it is to be particularly understood that the invention is not limited thereto or thereby, but that the inventive scope is defined in the appended claims.

We claim:

1. In a flexible wing glider the combination of a foldable wing canopy comprising a single sheet of flexible material, a plurality of suspension lines attached to the canopy for connection to a payload, certain of said suspension lines having shortened portions to hold the canopy when displayed in a parachutelike form, which is characterized by at least one catenary keel extending substantially fore and aft the entire length of the canopy from the leading edge to the trailing edge and attached to the lower surface of the canopy, the keel having suspension lines attached thereto, the depth of the keel from the canopy being between 1/5 and 1/15 of the length of the suspension lines attached thereto provide lateral stability to the canopy and to uniformly transfer weight from the payload through the suspension lines along the entire length of the keel to the canopy.

2. A glider according to claim 1 where the glider has two side flaps each enclosing a 450° angle, a central portion defining a trapezoidal shape having each side flap connected to the tapering sides by a seam, and a separate catenary keel connected to each seam, so as to provide a divergent channel for air flow from for to aft in the glider.

3. A glider according to claim 2 where the keel divergence from fore to aft is 15° on each side.